United States Patent
Skinner et al.

(10) Patent No.: US 8,344,904 B2
(45) Date of Patent: Jan. 1, 2013

(54) SIGNAL PROCESSING IN DOWNHOLE EQUIPMENT

(75) Inventors: Sandy Skinner, Aberdeen (GB); Michael Manning, Cornwall (GB)

(73) Assignee: Zenith Oilfield Technology Limited, Inverurie (GB)

( * ) Notice: Subject to any disclaimer, the term of this patent is extended or adjusted under 35 U.S.C. 154(b) by 480 days.

(21) Appl. No.: 12/527,843

(22) PCT Filed: Feb. 19, 2008

(86) PCT No.: PCT/GB2008/050105
§ 371 (c)(1),
(2), (4) Date: Apr. 5, 2010

(87) PCT Pub. No.: WO2008/102170
PCT Pub. Date: Aug. 28, 2008

(65) Prior Publication Data
US 2010/0194585 A1    Aug. 5, 2010

(30) Foreign Application Priority Data

Feb. 19, 2007   (GB) .................................. 0703162.8

(51) Int. Cl.
*G01V 3/00* (2006.01)
(52) U.S. Cl. .................. 340/853.2; 340/855.9; 166/313; 166/66.7
(58) Field of Classification Search ................ 340/855.9, 340/853.2; 361/56; 166/313, 66.7; 367/158, 367/25
See application file for complete search history.

(56) References Cited

U.S. PATENT DOCUMENTS

| | | | | |
|---|---|---|---|---|
| 3,887,898 | A * | 6/1975 | Jones | 367/25 |
| 3,932,836 | A * | 1/1976 | Harrell et al. | 367/158 |
| 4,581,613 | A * | 4/1986 | Ward et al. | 340/855.9 |
| 4,788,545 | A | 11/1988 | Farque | |
| 4,798,247 | A * | 1/1989 | Deaton et al. | 166/66.7 |
| 4,876,539 | A * | 10/1989 | Farque | 340/855.9 |
| 4,901,070 | A | 2/1990 | Vandevier | |
| 6,192,980 | B1 * | 2/2001 | Tubel et al. | 166/65.1 |
| 6,192,988 | B1 * | 2/2001 | Tubel | 166/313 |
| 6,464,011 | B2 * | 10/2002 | Tubel | 166/313 |
| 6,585,041 | B2 * | 7/2003 | Crossley | 166/53 |
| 6,587,037 | B1 | 7/2003 | Besser et al. | |
| 6,700,762 | B2 * | 3/2004 | Underwood et al. | 361/56 |

FOREIGN PATENT DOCUMENTS

| | | |
|---|---|---|
| GB | 2352321 A | 1/2001 |
| GB | 2355167 A | 4/2001 |
| GB | 2369759 A | 6/2002 |
| GB | 2394631 A | 4/2004 |

OTHER PUBLICATIONS

Notification Concerning Transmittal of International Preliminary Report on Patentability for International Application No. PCT/GB2008/050105 (Aug. 27, 2009).
International Search Report for International Application No. PCT/GB2008/050105 (Jul. 9, 2008).

\* cited by examiner

*Primary Examiner* — Jean B Jeanglaude
(74) *Attorney, Agent, or Firm* — Jenkins, Wilson, Taylor & Hunt, P.A.

(57) ABSTRACT

A method of transmitting power and/or data between downhole equipment and a surface through a circuit including an alternating current (AC) powered motor and its associated power cable for powering the downhole equipment is disclosed, where the data is transmitted at frequencies outside the normal operating ranges that are thought acceptable. Associated circuitry and apparatus for performing the method are disclosed.

10 Claims, 3 Drawing Sheets

SIGNAL PROCESSING IN DOWNHOLE EQUIPMENT

CROSS-REFERENCE TO RELATED APPLICATIONS

This application is filed under the provisions of 35 U.S.C. §371 and claims the priority of International Patent Application No. PCT/GB2008/050105 filed on Feb. 19, 2008, and of British Patent Application No. 0703162.8 filed on Feb. 19, 2007. The disclosures of the foregoing international patent application and British patent application are hereby incorporated by reference herein in their respective entireties.

TECHNICAL FIELD

The present invention relates to a signal processing in downhole equipment, in particular to a new method for transmission of data between the sub surface and a surface location.

BACKGROUND OF THE INVENTION

"Downhole equipment" is understood to refer to any tool, equipment or instrument that is used in a wellbore.

Data needs to be transmitted between downhole equipment and the surface for various purposes, for example:
- monitoring performance of motors/pumps
- transmission of control signals for control of valves
- measuring device orientation and position
- making physical measurements For motorised downhole equipment, data needs to be sent from below the equipment in a circuit that includes motor windings and the equipment's power cable. The rationale is that since there are already power cables present the cost of the solution using these should be proportionately less than one where you must supply the appropriate length of communications cable.

Therefore, due to the motor and power cable properties existing data transmission has traditionally been restricted to DC and low frequency signalling, usually at 1-6 Hz and exceptionally at a few kHz (up to 5).

SUMMARY

According to the present invention, there is provided a method of transmitting power and/or data between downhole equipment and a surface through a circuit including an alternating current (AC) powered motor and its associated power cable for powering the downhole equipment, wherein the data is transmitted at frequencies of 10 kHz or greater.

Preferably, the downhole equipment comprises a component of an artificial lift system.

Preferably, the downhole equipment comprises an electrical submersible pump (ESP).

Preferably, the transmitted data signals are frequency modulated.

Preferably, a multi-phase transformer is provided, the number of phases matching the supply phases of the motor).

Preferably, the motor comprises a single star-point connection.

According to a second aspect of the present invention there is provided a method for monitoring the performance of a motor, comprising the steps of transmitting power and/or data between downhole equipment and a surface according to any preceding claim, and monitoring the attenuation of the transmitted signal, and determining that a fault condition has occurred if the attenuation varies outside predetermined thresholds.

Preferably, the attenuation through each phase of the motor's windings is measured individually, and a specific phase is identified as being faulty on the basis of the measurements.

Preferably, the fault is determined as being with one of the cable, motor or monitor.

According to a third aspect of the present invention there is provided a system comprising downhole equipment and a control unit at a surface, arranged for (a) the transmission of power and/or data between the downhole equipment and the surface according to the method of the first aspect, and/or (b) the method for monitoring the performance of a motor according to the method of the second aspect.

Preferably, the system comprises a plurality of motors, in a stacked arrangement.

BRIEF DESCRIPTION OF THE DRAWINGS

The present invention will now be described, by way of example only, with reference to the accompanying drawings, in which.

DETAILED DESCRIPTION

One category of downhole equipment is artificial lift systems, for use in wells where there is insufficient pressure in the reservoir to lift the well's fluid (e.g. oil, water or gas) to the surface. Types of artificial lift systems include hydraulic pumps, Rod pumps, Electric Submersible Pumps (ESPs), Jet Pumps, Progressing-Cavity pumps (PCPs) and gas lift.

Figure 1:
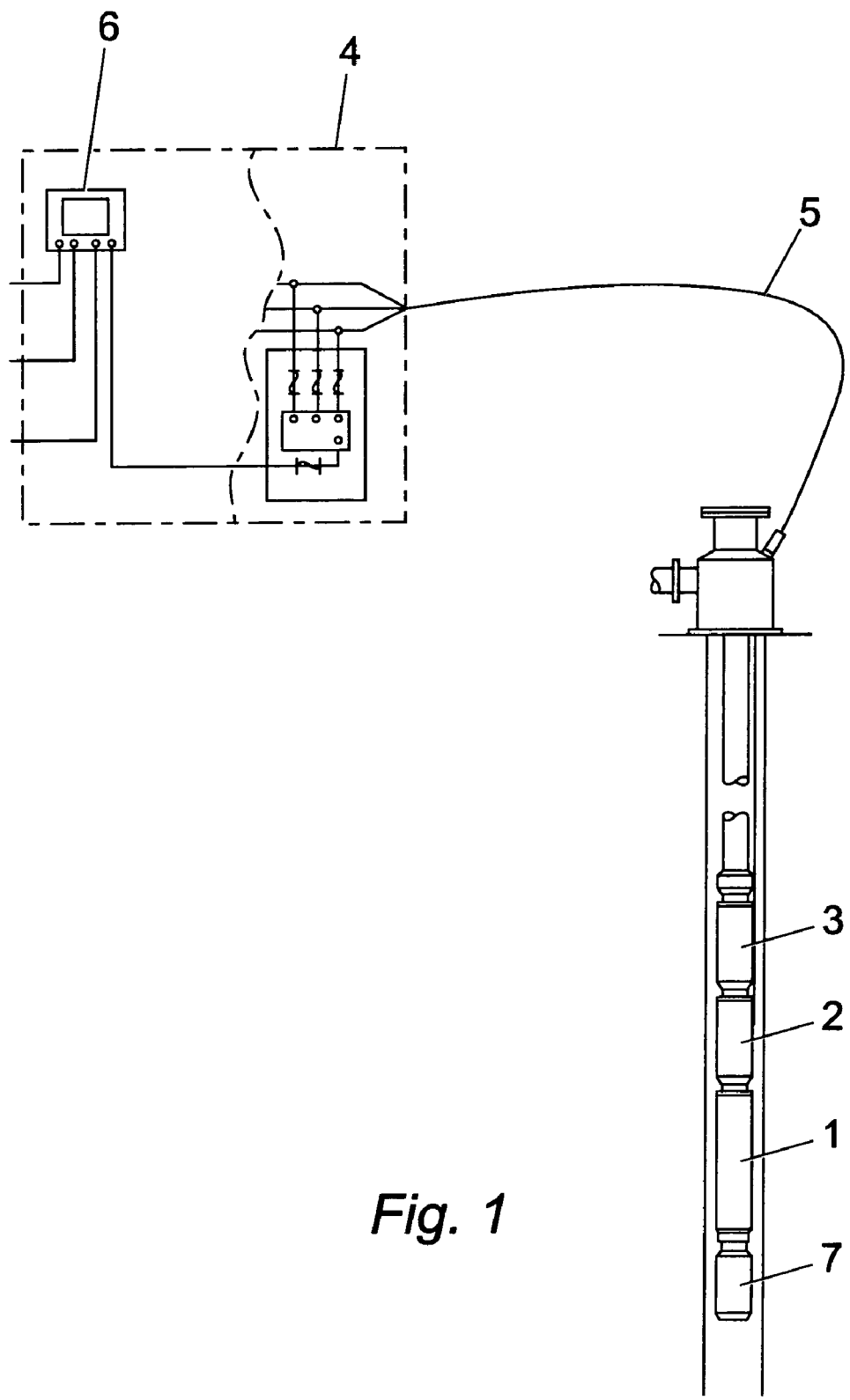
FIG. 1 shows the typical set up of a downhole equipment in a well, showing the positions of the equipment, the motor and the control interfaces at the surface.

A typical ESP application is illustrated in FIG. 1. In the ESP monitoring application the complete monitoring system comprises two distinct parts. These two parts communicate using the ESP power cable. One part at the surface and the other downhole. The surface part is divided into isolation, communications and data storage/presentation. The downhole part is similarly divided into isolation, communications and translation.

An ESP motor 1 is coupled through a seal 2 to a centrifugal pump 3 in a well known manner. In this embodiment, the motor is a three phase Y configuration. The motor is driven by a variable speed drive system 4 and is connected via three phase power cables 5 to a three phase transformer. A surface communications module 6 is connected to the downhole monitor 7 using one of the methods in FIGS. 2 and 3 using the existing three phase power cables.

Data is generated by the monitoring system by various means attached to the downhole motor through the star point. The star point is created at the base of the motor by a shorting block, typically copper, that has a pigtail connection specifically for the use of monitoring systems. In this application both power and communications are delivered to the monitoring system through this single star-point connection. Two way communications is achieved through this connection.

The surface isolation module limits the effect of the low frequency AC power signal on the data transmission system and the data communications module that is attached to the star-point of the motor.

The communications module is involved with receiving the data through the isolation module and uncoupling this from the ESP power cable.

The surface equipment has the capability to store and present the data and allow for the collection of data by an operator.

The downhole isolation module limits the effect of the low frequency AC power signal on the data transmission system and the ESP monitoring module that is attached to the star-point of the motor.

The downhole communications module is involved with transmitting the data and through the isolation module coupling this to the ESP power cable.

The ESP monitoring module also provides voltage, current, charge, field strength and other electronic translations appropriate to the application.

Figure 2:
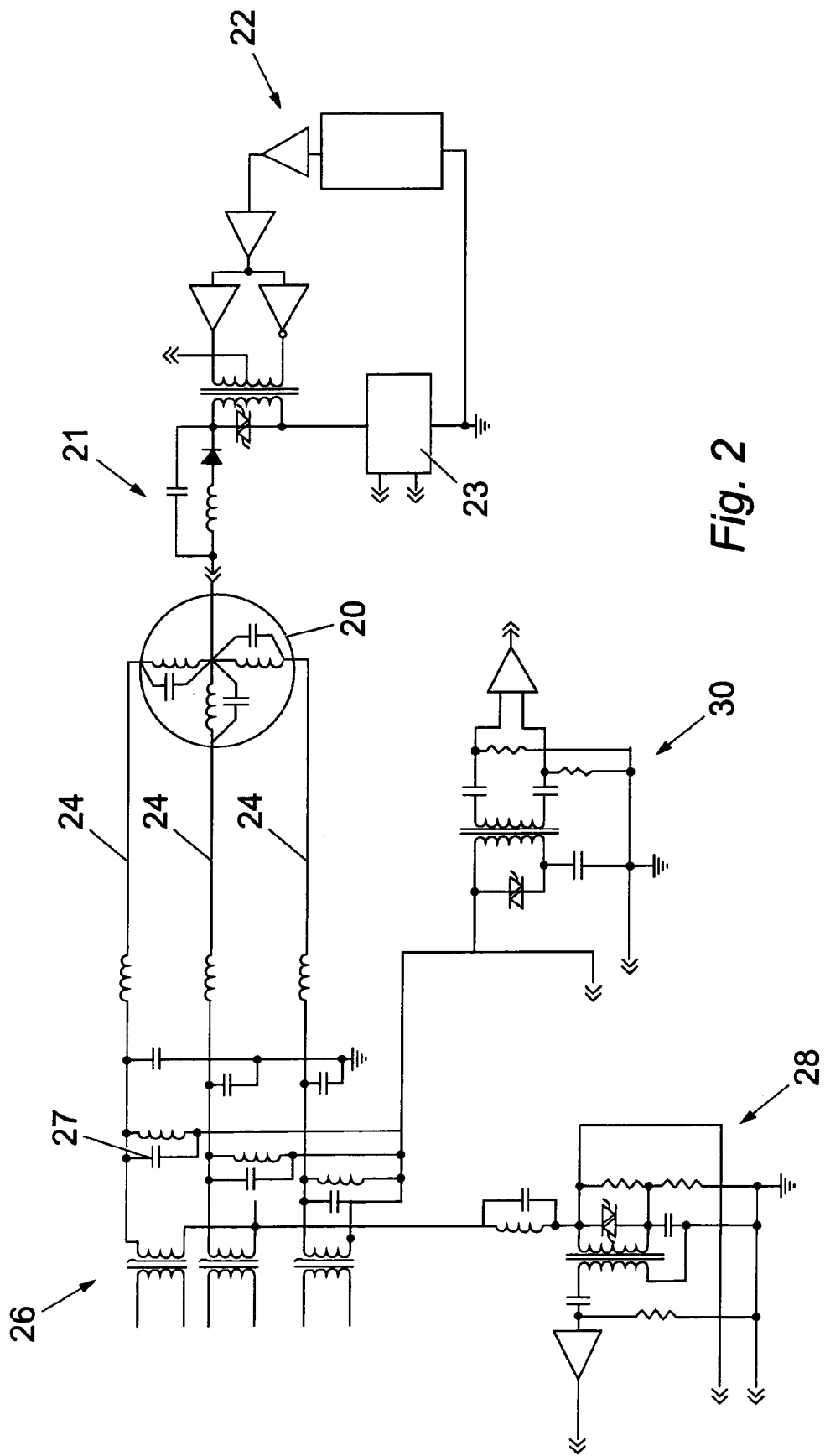
FIG. 2 Shows the inductive connections of a circuit diagram representing a first embodiment.

FIG. 2 show a model of the inductive connections for a Frequency Modulated signal (FM) system for communication in an electrical submersible pump (ESP) application.

An FM discriminator 28 30 (two alternatives shown) is inductively coupled to a suitably rated three phase choke 26 with high frequency bypass capacitors 27 and is further coupled to an ESP cable 24 and to a three phase ESP motor 20. The star point of the motor 20 connects through a choke with high frequency bypass capacitors 21 to a universal PSU 23 which powers the downhole FM driver 22.

Figure 3:
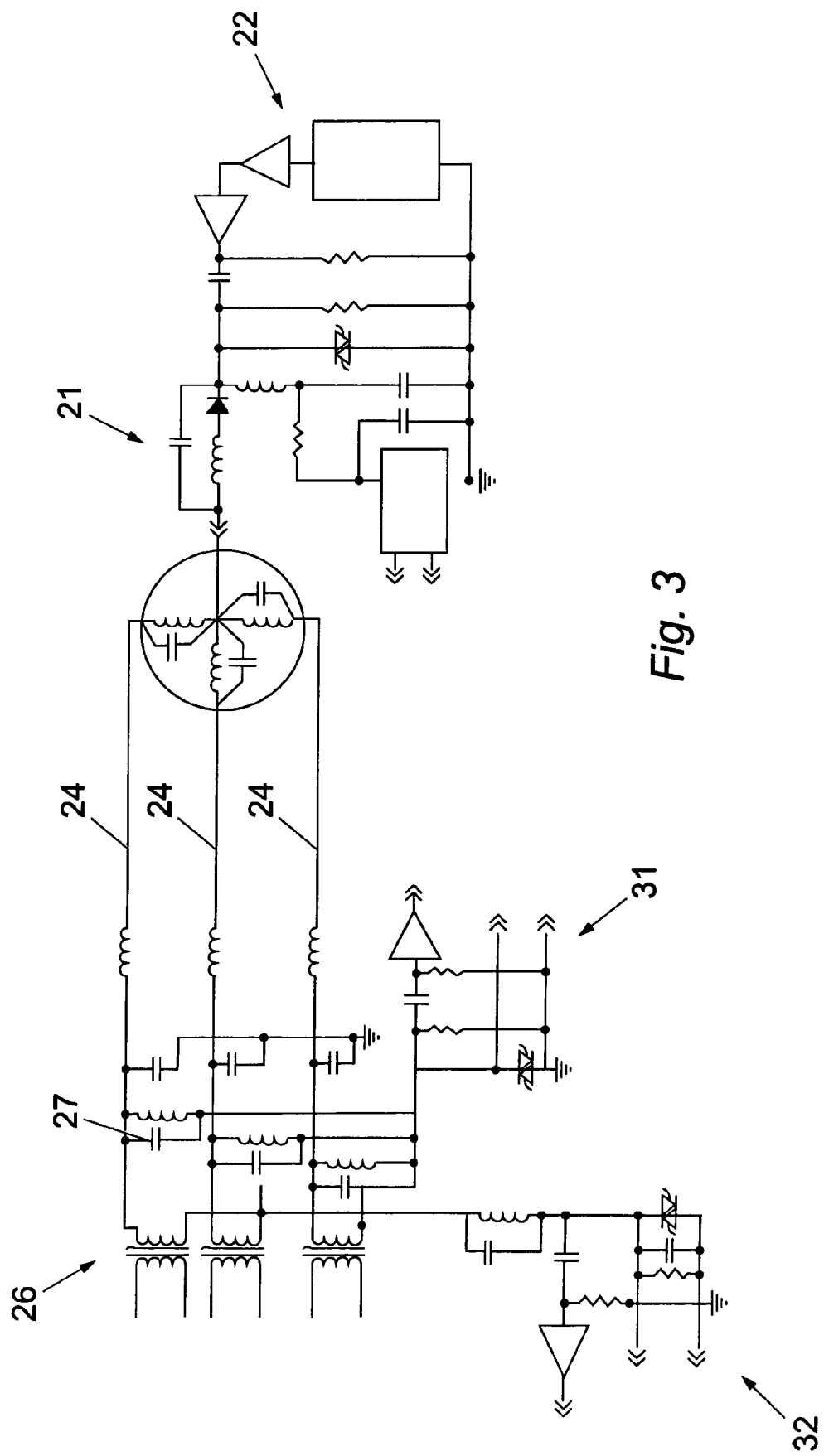
FIG. 3 Shows the capacitive connections of a circuit diagram illustrating a first embodiment as shown in FIG. 2.

FIG. 3 show a model of the capacitive connections for an FM system for communication in an electrical submersible pump (ESP) application.

An FM discriminator 31 32 (two alternatives shown) is capacitively coupled to a suitably rated three phase choke 26 with high frequency bypass capacitors 27 and is further coupled to an ESP cable 24 and to a three phase ESP motor 20. The star point of the motor 20 connects through a choke with high frequency bypass capacitors 21 to a universal PSU 23 which powers the FM driver 22.

Note:

This application data in the figures is taken from a 50 Kva motor and a cable length of 10,000 feet (3,000 meters).

Cable inductance and capacitance act as a simple low pass filter to the FM signal. This attenuates the signal, but also attenuates any high frequency system noise as well. At the operating frequency, 3,000 meters of three phase power cable is a constant impedance transmission line (50-100 Ohms) and can be dealt with as such.

The system response to the FM carrier operating over 3,000 meters carries an amplitude loss of 40 decibels which is relatively high but still acceptable. The downhole choke 21 presents about 1 gOhm of impedance to the carrier and so is shunted by the capacitors to carry the signal.

Assuming a 3% normal phase imbalance then the Y point of the motor is about 45 VAC for a 1500V motor and 120 VAC for a 4000V motor. At 70 Hz the nominal 500 H choke has about 250 kΩ impedance rising to 1M Ω at 30 Hz. Thus assuming a 250Ω resistive or inductive connection to ground via the universal PSU then the PSU will see a nominal 100 VDC and almost 0 VAC.

Under ground or phase fault conditions the Y point can rise to as much 70% of the phase voltage (assuming worst case 2000 VRMS at 30 Hz). Thus the PSU will then see 0 VDC, assuming this supply is effectively short circuited, and 2 VRMS after the choke. The actual level will depend upon the ground fault level. Given that under all conditions there is a lot of current available then if the PSU is designed to operate in a current mode (ac or dc) then it should continue to operate under normal or fault conditions. It would be possible to allow a maximum AC supply voltage on the PSU by providing pre-set voltage clamps on the PSU input.

These principles can be used to form a powerful diagnostic application. Previously, with dc power and dc signalling, if one phase shorted, both power and communication would be lost, but with the new invention a short to ground of one phase would not be detrimental in this way. The shorting to ground of one phase in most locations along the length of this electrical system would only produce an increase in attenuation.

Under a signal phase fault condition at the operating frequency the motor winding and surface transformer secondary impedance isolate the other two cable or motor connections from the ground fault.

Under this condition the signal aptitude will reduce by a worst case factor of 1.4 in addition to the existing losses. A ground fault of the motor is likely to be the worst case.

In a further aspect the signal processing we monitor how the signal is attenuated. This can be used as a diagnostic tool in operating systems to see where an earth leakage fault has occurred. The attenuation through each phase is measured and knowing this we can determine which phase and approximately where the fault is. That is to say whether the fault is a cable, motor or monitor fault.

It will be appreciated that this communication system can be applied across any system where there is a remote ac powered motor present and there is a need to transfer data from a monitoring system in proximity to the motor with a single star-point connection without the addition of dedicated wires.

Other applications where this communications system could be applied include:

Sub-sea control valves

Chokes

Sub-sea power transformer monitoring

ESPCP systems

Remote surface motor/transformer systems

General telemetry

The motor can also be in any phase configuration. It is also to be appreciated that for more powerful or more complex systems, a number of similar motors can be arranged in a stacked manner so that particular power output requirements can be met for a given installation.

Other communications systems are available but are limited in communication speed and are in the main one way communications and/or limited in range. In contrast, the present invention provides high frequency communications, high frequency power and a means of diagnostic fault location.

Various improvements and modifications can be made to the above without departing from the scope of the invention.

What is claimed is:

1. A method of transmitting power and/or data between downhole equipment and a surface through a circuit including an alternating current (AC) powered motor and its associated power cable for powering the downhole equipment, wherein the data is transmitted at frequencies of 10 kHz or greater and wherein the performance of the motor is monitored by monitoring the attenuation of the transmitted signal, and determining that a fault condition has occurred if the attenuation varies outside predetermined thresholds.

2. The method of claim 1, wherein the downhole equipment comprises a component of an artificial lift system.

3. The method of claim 1, wherein the downhole equipment comprises an electrical submersible pump (ESP).

4. The method of claim 1, wherein the transmitted data signals are frequency modulated.

5. The method of claim 1, wherein a multi-phase transformer is provided, the number of phases matching the supply phases of the motor.

6. The method of claim 1, wherein the motor comprises a single star-point connection.

7. The method of claim 1, wherein the fault is determined as being with one of the cable, motor or monitor.

8. The method of claim 1, wherein the attenuation through each phase of the motor's windings is measured individually, and a specific phase is identified as being faulty on the basis of the measurements.

9. A system comprising downhole equipment and a control unit at a surface, arranged for the transmission of power and/or data between the downhole equipment and the surface through a circuit including an alternating current (AC) powered motor and its associated power cable for powering the downhole equipment, wherein the data is transmitted at frequencies of 10 kHz or greater and wherein the performance of the motor is monitored by monitoring the attenuation of the transmitted signal, and determining that a fault condition has occurred if the attenuation varies outside predetermined thresholds.

10. The system of claim 9, comprising a plurality of motors, in a stacked arrangement.

* * * * *